March 20, 1962     D. E. SMITH     3,025,727
METHOD OF MAKING A CUTTING DIE
Filed May 22, 1959     2 Sheets-Sheet 1
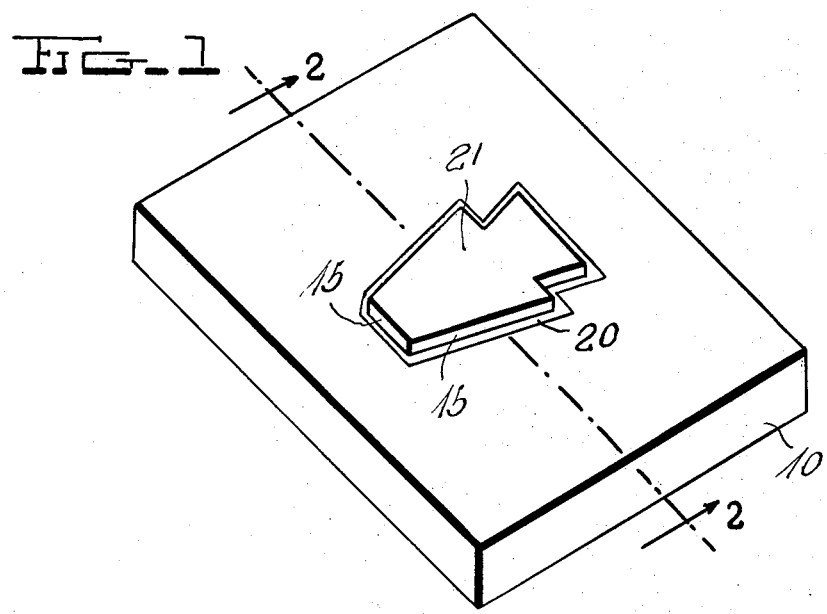
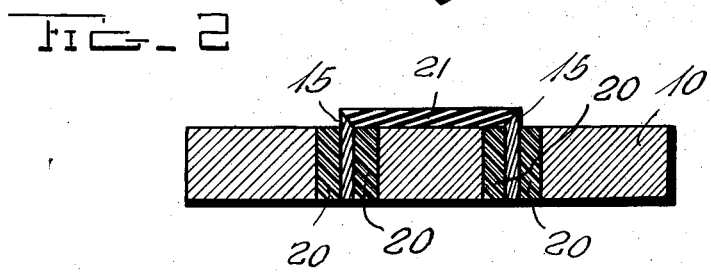
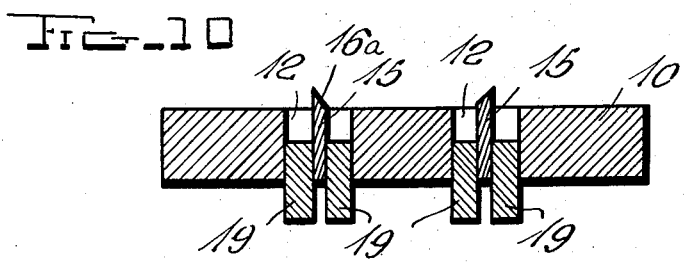
INVENTOR
DALE E. SMITH,
BY *Felix A. Russell*
ATTORNEY

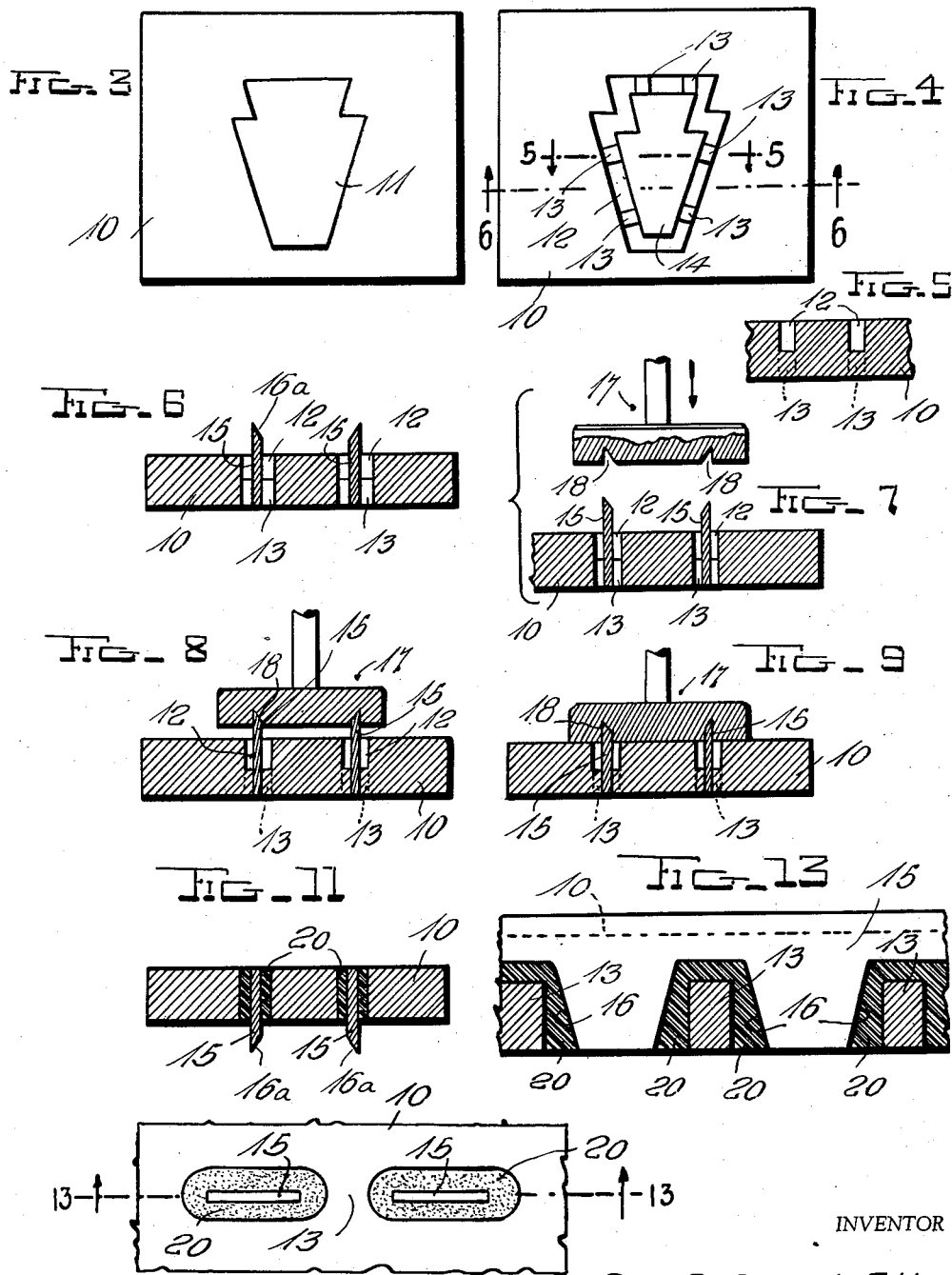

3,025,727
METHOD OF MAKING A CUTTING DIE
Dale E. Smith, Ashland, Ohio, assignor to Cast-Die, Incorporated, Ashland, Ohio, a corporation of Ohio
Filed May 22, 1959, Ser. No. 815,068
1 Claim. (Cl. 76—107)

The present invention relates to a cutting die and consists in the combinations, constructions, arrangements of parts and method herein described and claimed.

Generally the invention comprises the provision of a die of novel character which may be made of relatively inexpensive materials and which is particularly adapted for use where the cost of conventional dies may be prohibitive. The method of making the die of the present invention consists essentially of providing a design upon a wooden block, next providing a groove encompassing the outline of such design, leaving novel "bridges" which will hereinafter be described, in such groove, next placing novel blade members in position in the groove, next centering the blades in the groove in novel manner, next temporarily affixing the blades in such centered position and thereafter filling the groove with a plastic such as a casting type resin to permanently hold the blades in position.

It is an object, therefore, of the invention to provide a novel cutting die which is simple in construction, inexpensive to manufacture and yet effective and efficient in use.

Another object of the invention is the provision of a novel method of making the aforementioned cutting die.

Still another object of the invention is the provision of a novel bridge construction forming a part of the invention.

A further object of the invention is the provision, in a method of making a cutting die, of a novel arrangement of steps in its manufacturing procedure.

A still further object of the invention is the provision in a method as above set forth, of the novel use of casting type resins in the mounting of cutting blades in a wooden block, such blades and block forming parts of the invention.

Other and further objects of the invention will become apparent from a reading of the following specification taken in conjunction with the drawings, in which:

FIGURE 1 is a perspective view of a cutting die made in accordance with the teachings of the present invention, FIGURE 2 is a sectional view taken along line 2—2 of FIGURE 1, FIGURE 3 is a plan view of a block having a design of the cutting blades of a die marked thereon, FIGURE 4 is a view similar to FIGURE 3 but showing the same after certain portions thereof have been cut away, FIGURE 5 is an enlarged fragmentary sectional view taken along line 5—5 of FIGURE 4, FIGURE 6 is a sectional view taken substantially along line 6—6 of FIGURE 4 and showing certain blades positioned therein, FIGURES 7, 8 and 9 are sectional views similar to FIGURE 6 but illustrating the means for centering blades in the cut out portions of the block, FIGURE 10 is a view, somewhat enlarged, similar to FIGURE 9 but illustrating the placement of certain temporary holding wedges forming a part of the invention, FIGURE 11 is a view similar to FIGURE 9 but showing the block inverted and the placement of casting type resin in the cut-away portions thereof to seal the blades in position and illustrating another step in the process of the invention, FIGURE 12 is a fragmentary bottom plan view of the device illustrated in FIGURE 1, and FIGURE 13 is a sectional view taken substantially along line 13—13 of FIGURE 12.

Referring more particularly to the drawings, there is shown therein a wooden block 10 which is preferably formed of hardwood or hard plywood. In carrying out the invention, an outline in pencil, indicated at 11, is drawn upon the upper face of the block 10 in the exact configuration it is desired to position the cutting blades of a die when the same takes its final form.

An opening 12 is cut entirely through the block 10 with its sides extending a short distance from either side of the design line 11 with, however, "bridges" 13 left in position in the lower portion thereof at spaced intervals whereby to maintain that portion 14 of the block which is defined by the opening 12 as an integral part of the block 10.

An elongated blade 15 which is relatively thin but of a height slightly greater than the height of the block 10 is positioned in the opening 12 and is provided in its lower edge with cut away portions 16 at intervals so that clearance is provided and that the blade 15 may thus straddle each of the bridges 13, as shown particularly in FIGURE 13. Instead of a single blade 15, a plurality of such blades may be provided if the particular design calls for the same. The blade 15 is sharpened at its upper edge, as indicated at 16a.

In further carrying out the method of the present invention, a punch generally indicated at 17 and provided with the conventional cutting grooves 18 is then brought downwardly upon the blades 15 as indicated in FIGURES 7, 8 and 9 to thereby exactly position the blades 15 within the openings 12 whereupon, while the blades 15 are thus maintained by the grooves 18 in proper position, the block and punch 17 are inverted and blocks 19 of soft wood or the like are wedged into position upon either side of the blade 15 within the opening 12 to thus secure the blade 15 in the selected position. While in such inverted position, a plastic substance such as a casting type resin 20 is poured into the opening 12 while at the same time the blocks or wedges 19 are removed. The plastic material 20 will then act to permanently affix the blades in position within the block 10, entirely filling the opening 12 and the cut away portion 16 of the blade around the bridges 13. To complete the cutting die, a stripper 21 may be affixed to the upper side of the block 10 in the space encompassed by the blade 15.

While but one form of the invention has been shown and described herein, it will be readily apparent to those skilled in the art that many minor modifications may be made without departing from the spirit of the invention or the scope of the appended claim.

What is claimed is:

The method of making a cutting die comprising cutting a partial opening having the general contour of the desired punching in a die block, said partial opening having bridging portions of the material forming said block integrally interconnecting the lower sides of said opening at spaced intervals, positioning a blade longitudinally in said opening, said blade being of such thickness and said opening being of such size and width as to provide relatively narrow channels on both sides of said blade, placing a punch plate over said block to receive said blade therein, next inverting said block and punch plate, next affixing said blade in said opening by temporary wedge blocks, and finally pouring a settable substance into said channels while simultaneously removing said temporary blocks.

References Cited in the file of this patent
UNITED STATES PATENTS

| | | |
|---|---|---|
| 2,765,034 | Wilshaw | Oct. 2, 1956 |
| 2,817,273 | Phillips et al. | Dec. 24, 1957 |
| 2,821,871 | Sarno | Feb. 4, 1958 |
| 2,899,849 | Laughter et al. | Aug. 18, 1959 |
| 2,993,421 | Phillips et al. | July 25, 1961 |